United States Patent Office 3,600,243

Patented Aug. 17, 1971

3,600,243
METHOD OF MAKING CHROMIUM MASK FOR PHOTORESIST APPLICATION

Armand P. La Rocque, New Shrewsbury, and Alex Rogel, Red Bank, N.J., assignors to the United States of America as represented by the Secretary of the Army No Drawing. Original application Nov. 9, 1966, Ser. No. 593,603. Divided and this application Feb. 26, 1969, Ser. No. 819,505

Int. Cl. B32b *31/14*; B44c *1/22*; C23f *1/00*

U.S. Cl. 156—3 1 Claim

ABSTRACT OF THE DISCLOSURE

A durable and adherent film of chromium of about 2000 to about 4500 angstroms in thickness is first vacuum deposited onto a glass substrate. A durable chromium mask suitable for photoresist applications is then made by coating the chromium film with photoresist, air drying the photoresist covered chromium film and then prebaking the covered film at 100 to 120 degrees C. for at least 15 minutes, placing a photographic transparency having the desired pattern over the photoresist film, exposing the film to ultraviolet light, developing and then finally baking the photoresist at 100 to 120 degrees C. for 5 to 15 minutes, etching the chromium film in the areas void of photoresist in a solution of about 1 to 3 grams of zinc metal in about 20 to 50 cc. of concentrated hydrochloric acid, and heating the film to about 400 degrees C. after pattern etching.

This application is a division of application Ser. No. 593,603, filed Nov. 9, 1966, now abandoned.

This invention relates to durable, adherent pinhole-free thin films of chromium, to their method of manufacture, and to the use of the chromium films as masks in making photoresist patterns for microcircuitry.

The preparation of thin films of refractory materials such as chromium has presented certain problems. That is, vacuum melting of chromium for example, is difficult because of its high melting point and its reactivity with most common crucible materials. Crucibles for melting chromium have to be very refractory, and only zirconia, beryllia, and alumina crucibles lined with thoria have been used with any degree of success for chromium evaporation.

Arc melting under an inert atmosphere is another method which has been used for melting refractory materials. However, this method often requires some form of purification of the material prior to melting, and this makes the process complicated. Another method involves evaporating chromium by fusing chromium metal in a three-stranded tungsten wire "cup". In that method, the chromium is preheated in an atmosphere of hydrogen or helium and fused with the tungsten. The method is undesired in that it is impractical where it is desired to prepare a thin film of chromium.

An object of this invention is to provide a practical method of preparing durable thin films of chromium of about 2000 to about 4500 angstroms in thickness that will adhere well to substrates such as glass or silicon, and that will be further characterized by high mechanical hardness, absence of pinholes, and solubility in certain etchants. A further object of this invention is to provide a method of using the thin chromium films as masks in making photoresist patterns for microcircuitry.

It has now been found that the aforementioned objectives can be attained by using an electron beam evaporation method for preparing the chromium films and by a technique for etching the chromium films using a photoresist process and an acid and metal etchant.

In a more detailed manner, the method involves fusing a known quantity of chemically pure chromium in an evaporator. This is accomplished by weighing chromium powder in a carbon crucible. The crucible and its contents are then superimposed on a suitable support such as a water cooled copper pedestal in an evaporator containing an electron beam gun. The chromium is melted and fused in the carbon crucible under vacuum.

Then, a suitable substrate such as a non-corrosive microscopic glass slide is suitably cleaned in a well known manner with detergent and ultrasonically in acetone, alcohol, and warm demineralized water. The glass slide is then dried with lint-free paper and placed in a vacuum system on a metal support directly above the carbon crucible containing the fund chromium. The vacuum system is then pumped down to $3\times10^{-6}$ millimeter of mercury pressure. The primary current switch is then turned on and the current is slowly brought up to 0.6 ampere, at which time the electron beam power is turned on, and the controls are set at a beam current of 50 milliamperes and 0.5 kilovolt. The shutter between the source and evaporant is kept closed during this period. After two minutes at this setting, the electron beam current is turned up to 100 milliamperes and the voltage set at one kilovolt. Outgassing takes place and the pressure rises to $9\times10^{-5}$ millimeter of mercury. After several minutes of outgassing, the shutter is opened for the deposition of chromium on the glass slide. The period of time necessary for the completion of evaporation is varied with the desired film thickness. After completion of evaporation, the shutter is closed and the electron beam power is shut off. The vacuum system is allowed to cool for one hour and then back filled with nitrogen.

Film thickness is determined by calculation using the formula $$T=\frac{M}{4\pi dR^2}$$

wherein:

T=Film, thickness in centimeters (deposit)
R=Distance in centimeters from source to evaporant
$d$=Density of material (chromium) 7.2 grams/cc.
M=Evaporant material in grams To make the chromium mask, the glass slide covered with a chromium film of about 2000 to about 5000 angstroms in thickness is coated with photoresist, air dried, and heated in an oven at 100 to 120° C. for 5 to 15 minutes. A photographic transparency having the desired pattern is then placed over the photoresist film, and the film is exposed to light. Exposure is followed by developing and further heat treatment at 100 to 120° C. for at least 15 minutes. The glass slide bearing the chromium film is then etched in a solution of zinc metal in concentrated hydrochloric acid, and the film heated to about 400° C. after pattern etching.

In mask fabrication, the thickness of the chromium film must be restricted to a maximum of 4500 angstroms. Thicker films require a longer etching period in hydrochloric acid and zinc metal, and this longer time period can cause undercutting and lifting of the photoresist films. Moreover, some shattering and lifting occurs on evaporated films of over 5000 angstroms in thickness.

The preparation of films thicker than 5000 angstroms by this method is not recommended since shattering and lifting of chromium occurs. Moreover, with thicker films the photoresist breaks down before the completion of etching because of the increased time of exposure to the HCl and zinc etchant. Generally, the amount of zinc used in the etchant should be in the ratio of about 1 to 3 grams of zinc to about 20 to 50 cc. of concentrated HCl. Any of the commercially available photoresists that are used for thin films can be used in the method.

Thus, it has been found that by employing the method of the invention, one can deposit a durable and adherent chromium film on a glass slide from a fused chromium powder source. The film exhibits good adhesion to a glass slide, is free from pinholes, and is easily etched. Micropatterns can be prepared from these films by the use of photoresist techniques using a special etch and heat treatment. The masks have good line definitions and can be used unlimited times without being scratched or defaced for obtaining contact exposures of photoresist film. Since the preparation of masks is a tedious and expensive operation, the use of a durable and permanent material in mask fabrication is highly advantageous.

The foregoing description is to be considered as illustrative of the invention and not in limitation thereof.

What is claimed is:

1. A method of preparing a durable chromium mask for photoresist applications comprising vacuum depositing a durable and adherent film of chromium of about 2000 to about 4500 angstroms in thickness onto a glass substrate, coating the chromium film with photoresist, air drying the photoresist covered chromium film and then prebaking the covered film at 100 to 120 degrees C. for at least 15 minutes, placing a photographic transparency having the desired pattern over the photoresist film, exposing the film to ultraviolet light, developing and then finally baking the photoresist at 100 to 120 degrees C. for 5 to 15 minutes, etching the chromium film in the areas void of photoresist in a solution consisting of about 1 to 3 grams of zinc metal in about 20 to 50 cc. of concentrated hydrochloric acid, and heating the film to about 400 degrees C. after pattern etching.

References Cited

UNITED STATES PATENTS

| | | | |
|---|---|---|---|
| 2,599,914 | 6/1952 | Hartsuch et al. | 75—111 |
| 2,830,899 | 4/1958 | Brown | 156—8 |

OTHER REFERENCES

Holland L. Vacuum Deposition Of Thin Films, John Wiley & Sons, Inc., N.Y., 1956, pp. 135–6.

Powell, et al.: Vapor Deposition, John Wiley & Sons, Inc., N.Y., 1966, pp. 222–4 and 558.

ALFRED L. LEAVITT, Primary Examiner

K. P. GLYNN, Assistant Examiner

U.S. Cl. X.R.

156—8, 18; 117—8, 107; 96—36.2